(12) United States Patent
Farley

(10) Patent No.: US 11,465,919 B2
(45) Date of Patent: Oct. 11, 2022

(54) CONICAL SHOWERHEAD AND FILTER

(71) Applicant: David K. Farley, Corona, CA (US)

(72) Inventor: David K. Farley, Corona, CA (US)

(*) Notice: Subject to any disclaimer, the term of this patent is extended or adjusted under 35 U.S.C. 154(b) by 0 days.

(21) Appl. No.: 16/425,738

(22) Filed: May 29, 2019

(65) Prior Publication Data
US 2020/0377384 A1 Dec. 3, 2020

(51) Int. Cl.
*C02F 1/28* (2006.01)
*E03C 1/04* (2006.01)
*B05B 15/40* (2018.01)

(52) U.S. Cl.
CPC .............. *C02F 1/281* (2013.01); *B05B 15/40* (2018.02); *E03C 1/0409* (2013.01); *C02F 2201/006* (2013.01); *C02F 2307/06* (2013.01); *E03C 2201/40* (2013.01)

(58) Field of Classification Search
CPC .... B05B 15/40; E03C 1/0409; C02F 2307/06; B01D 24/04; B01D 24/12; B01D 2201/02; B01D 2201/0404
USPC ........................................................ 210/456
See application file for complete search history.

(56) References Cited

U.S. PATENT DOCUMENTS

| | | | | |
|---|---|---|---|---|
| 231,494 | A * | 8/1880 | McCauley et al. | |
| 2,367,557 | A * | 1/1945 | Atwood | C12H 1/0408 426/442 |
| 3,747,767 | A * | 7/1973 | Hankammer | B01D 35/28 210/282 |
| 5,503,742 | A * | 4/1996 | Farley | B01D 29/01 210/238 |
| 6,016,977 | A * | 1/2000 | Farley | C02F 1/003 239/553.3 |
| 6,270,023 | B1 * | 8/2001 | Farley | C02F 1/003 239/525 |

\* cited by examiner

*Primary Examiner* — Benjamin M Kurtz
(74) *Attorney, Agent, or Firm* — Stetina Brunda Garred & Brucker

(57) ABSTRACT

A filter cartridge for a showerhead includes a frame having an upstream plate and a downstream plate, both having a respective plurality of openings formed therein. The frame defines at least one upstream void outside of the upstream plate, and at least one downstream void outside of the downstream plate. A filter element is coupled to the frame and has a conical configuration including upstream and downstream faces, and a sidewall extending between the upstream face and the downstream face, with the upstream face being smaller than the downstream face. The filter element is positioned relative to the frame with the upstream face in direct fluid communication with the at least one upstream void and the plurality of openings formed in the upstream plate, and the downstream face in direct fluid communication with at least one downstream void and the plurality of openings formed in the downstream plate.

20 Claims, 3 Drawing Sheets

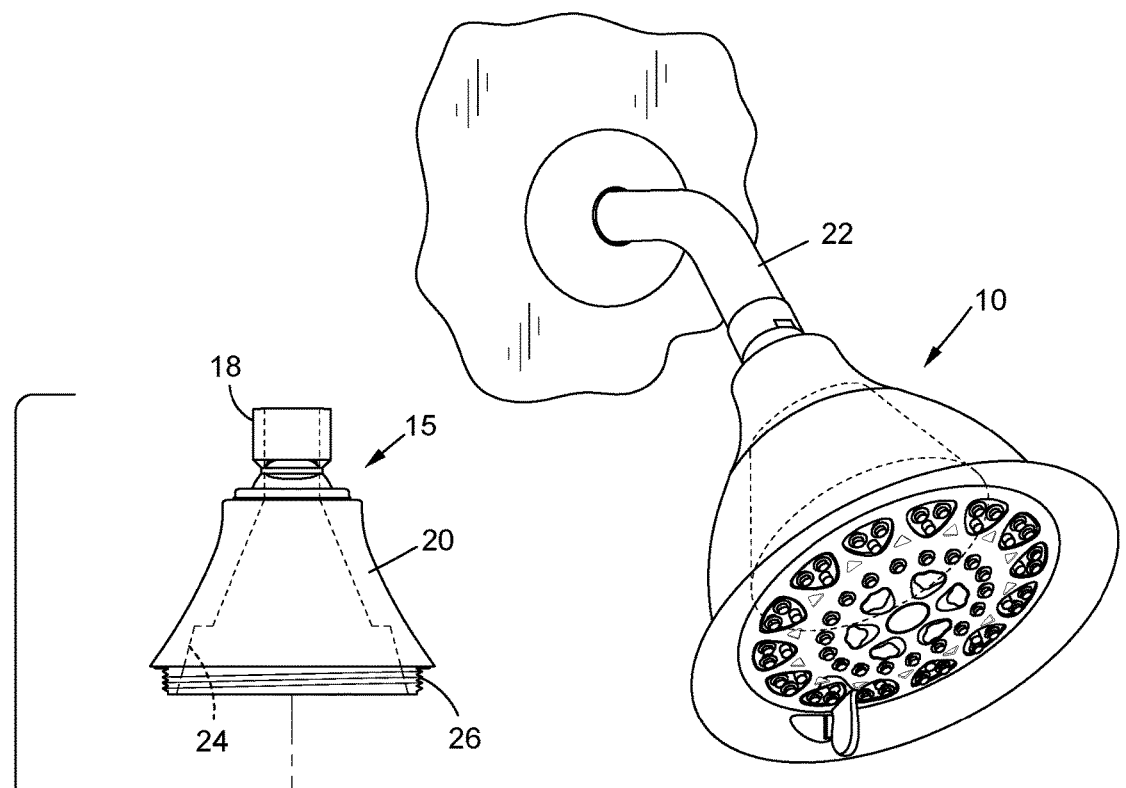
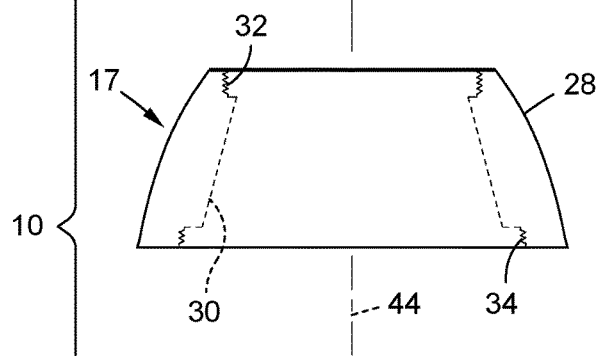
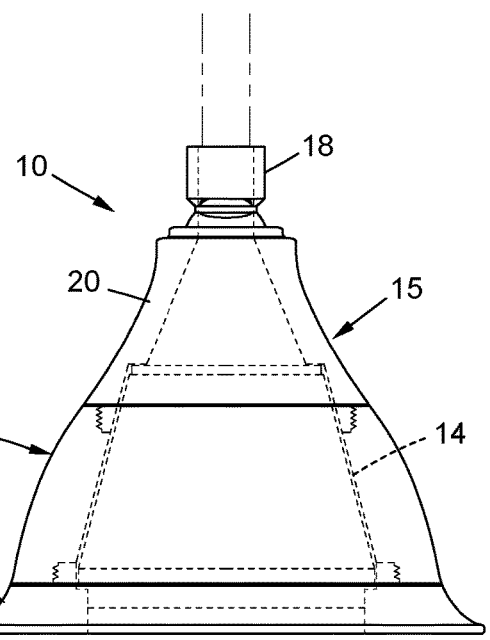
FIG. 1
FIG. 2
FIG. 3

CONICAL SHOWERHEAD AND FILTER

CROSS-REFERENCE TO RELATED APPLICATIONS

Not Applicable

STATEMENT RE: FEDERALLY SPONSORED RESEARCH/DEVELOPMENT

Not Applicable

BACKGROUND

1. Technical Field

The present disclosure relates generally to a shower filter and, more particularly, to a shower filter having a conical configuration and a tuned deflector system to distribute water flow throughout the shower filter.

2. Description of the Related Art

Shower filters of various types are well-known. Many shower filters are formed as cylindrical bodies having cylindrical filter cartridges formed therein. Such shower filters are typically in-line shower filters connected at one end to a shower arm and at the other end to a showerhead. While in-line shower filters may be effective in filtering impurities as the water flows from the shower arm to the showerhead, the shower filters may suffer from certain limitations. For example, the use of an in-line shower filter in combination with the separate showerhead tends to move the position of the showerhead further into the shower stall, to a position that may be less desirable.

More recently, the functionality of the shower filter and a showerhead have been combined in a single filtered showerhead, where the body of the showerhead may be sized and configured to contain a filter cartridge. The position of the filter cartridge is such that as water flows through the showerhead, the filter cartridge removes impurities from the water prior to the water being discharged from the showerhead. Such filtered showerheads may provide advantages, such as limiting the extension of the showerhead into the shower, while also providing the functionality of filtering the water. However, integrating the filter cartridge into the showerhead may be associated with certain limitations. For example, the filter cartridge may not fit well within the showerhead, or may be too small to be effective. In this regard, the filter cartridge may be cylindrical in shape, with equal diameter inlets and outlets. However, the standard shower head is narrow at the point of attachment to the shower arm, and wider at the spray face, creating a conical shape. As such, the mismatched configuration of the internal cavity of the showerhead and the filter cartridge may lead to undesirable results, such as reduced filtering capabilities or a shortened lifespan.

In view of foregoing, it is desirable to have a filter cartridge that can fit within a conically shaped showerhead and provide suitable filtration capacity for water flowing through the showerhead. Various aspects of the present disclosure address this particular need, as will be discussed in more detail below.

BRIEF SUMMARY

In accordance with one embodiment of the present disclosure, there is provided a showerhead having a conically shaped internal cavity and a corresponding conically shaped filter cartridge. The conical configuration of the internal cavity and the filter cartridge may allow for maximization of the filtering capacity of the showerhead, while also allowing the showerhead to maintain a desirable external configuration. The filter cartridge may additionally include one or more deflector plates which function to distribute water throughout the filter cartridge to maximize the effectiveness and lifespan of the filter cartridge.

According to one embodiment, there is provided a filter cartridge for a showerhead. The filter cartridge includes a frame having an upstream plate that is of a first diameter and a downstream plate that is of a second diameter greater than the first diameter. Both the upstream plate and the downstream plate have a respective plurality of openings formed therein. The frame defines at least one upstream void outside of the upstream plate, and at least one downstream void outside of the downstream plate. A filter element is coupled to the frame and has a conical configuration including an upstream face, a downstream face, and a sidewall extending between the upstream face and the downstream face, with the upstream face being smaller than the downstream face. The filter element is positioned relative to the frame such that the upstream face of the filter element is in direct fluid communication with the at least one upstream void and the plurality of openings formed in the upstream plate, and the downstream face of the filter element is in direct fluid communication with the at least one downstream void and the plurality of openings formed in the downstream plate.

The frame may include an upstream rim, a downstream rim, and a sidewall extending between the upstream and downstream rims. The frame may additionally include a plurality of upstream voids positioned between the upstream plate and the upstream rim. A plurality of upstream spokes may extend from the upstream plate, with the plurality of upstream spokes at least partially defining the plurality of upstream voids. The frame may further include a plurality of downstream voids positioned between the downstream plate and the downstream rim. A plurality of downstream spokes may extend from the downstream plate, with the plurality of downstream spokes at least partially defining the plurality of downstream voids. There may be a greater number of downstream voids than upstream voids.

The upstream face and the downstream face of the filter element may be planar.

According to another embodiment, there is provided a filter cartridge for a showerhead. The filter cartridge includes a filter element having an upstream end portion and a downstream end portion, and a frame having a cavity sized to receive the filter element. The frame defines a plurality of upstream openings and a plurality of downstream openings. The plurality of upstream openings are in fluid communication with the upstream end portion of the filter element and are sized and numbered relative to the filter element to allow for substantial even distribution of water across the upstream end portion. The plurality of downstream openings are in fluid communication with the downstream end portion of the filter element and are sized and numbered relative to the filter element to allow for substantial even receipt of water across the downstream end portion.

It is contemplated that another embodiment includes a showerhead comprising a body having tapered sidewalls defining an internal cavity, with the body being attachable to a water source to receive water therefrom. A filter cartridge is disposable within the internal cavity, with the filter cartridge comprising a conical configuration.

The frame may include a sidewall that is complementary in shape to the sidewall of the body.

The present disclosure will be best understood by reference to the following detailed description when read in conjunction with the accompanying drawings.

BRIEF DESCRIPTION OF THE DRAWINGS

These and other features and advantages of the various embodiments disclosed herein will be better understood with respect to the following description and drawings, in which:

FIG. 1 is an exploded front view of a showerhead including the filer cartridge of the present disclosure;

FIG. 2 is an assembled front view of the showerhead shown in FIG. 1;

FIG. 3 is a lower perspective view of the showerhead shown in FIG. 2 as mounted to a water conduit;

Common reference numerals are used throughout the drawings and the detailed description to indicate the same elements.

DETAILED DESCRIPTION

Figure 4:
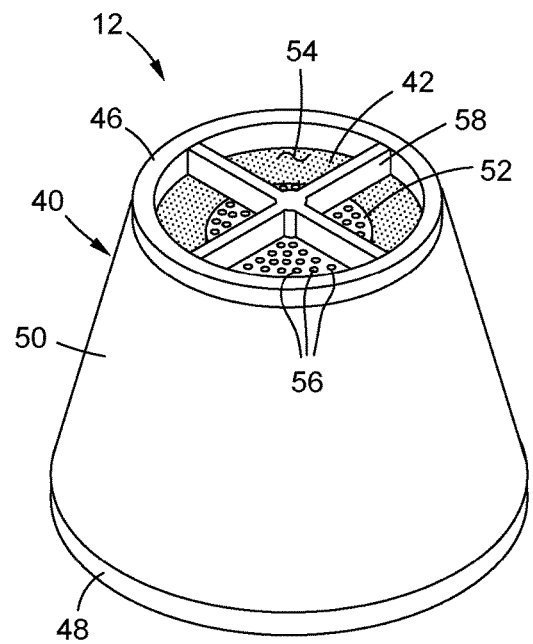
FIG. 4 is an upper perspective view of a conical filter cartridge sized to be placeable within the showerhead.

Referring now to the drawings, wherein the showings are for purposes of illustrating a preferred embodiment of the present disclosure only, and are not for purposes of limiting the same, there is depicted a showerhead 10 having a conical shower filter cartridge 12 integrated therein. More specifically, the filter cartridge 12 is received within a conically shaped internal cavity 14. The complementary conical shape of the internal cavity 14 and the filter cartridge 12 maximizes the volume of the filtering media that can be placed in the showerhead 10. Furthermore, the filter cartridge 12 may be specifically configured to control the flow of water therethrough so as to distribute the water throughout the filter media to use the entirety of the filter media, e.g., to mitigate formation of dead zones within the filter media, which may result in increased filtering capability and extended lifespan.

FIG. 1 is an exploded view of one embodiment of a showerhead 10, which is shown in an assembled state in FIG. 2. The showerhead 10 may include a multipiece, conical body including an inlet element 15, an intermediate element 17, and an outlet element 19. The inlet element 15 may include a swivel connector 18 pivotally connected to a main inlet body 20. The swivel connector 18 may be connectable to a shower arm 22 or other water conduit to receive pressurized water therefrom. The main inlet body 20 may be generally tapered, with an outer wall having a peripheral dimension, e.g., diameter or circumference, that increases in size away from the swivel connector 18. The main inlet body 20 may additionally include an inner wall 24 also having a peripheral dimension that increases in size away from the swivel connector 18. The inlet element 15 may include an externally threaded collar 26 for facilitating engagement with the intermediate element 17.

The intermediate element 17 may include an outer wall 28 and an inner wall 30, both of which may include a peripheral dimension which increases away from the inlet element 15. The intermediate element 17 may include a first internally threaded end portion 32 configured to engage with the threaded collar 26 and an opposing second internally threaded end portion 34 configured to engage with an externally threaded collar 36 on the outlet element 19. The outlet element 19 may include a plurality of openings which define a prescribed spray pattern when water flows through the openings. The outlet element 19 may include a rotatable portion which selectively opens and closes certain ones of the plurality of openings 38 to modify the spray pattern, as desired.

When the intermediate element 17 is connected to both the inlet element 15 and the outlet element 19, the body of the showerhead 10 is narrow at the inlet and is wider at the outlet. In this regard, the inlet may be configured to attach to a one-half inch shower arm 22, while the outlet end of the body may be 3-7 inches, or more. As such, the body defines a generally conical shape, having a wide outlet and a narrow inlet. As used herein, the term conical simply refers to a structure with one end portion being narrower than an opposing end portion. The inlet element 15, intermediate element 17, and outlet element 19 may also collectively define the internal cavity 14, which may mimic the outer configuration of the body. In this regard, the internal cavity 14 may be generally conical in shape, with a narrow end portion adjacent the inlet element 15, a wider end portion adjacent the outlet, and tapered sidewalls extending between the inlet element 15 and outlet element 19, with the sidewalls having an increased peripheral dimension as the sidewalls extend away from the inlet element 15.

As can be seen in FIG. 1, the filter cartridge 12 is positionable within the body, e.g., the assembly defined by the inlet element 15, intermediate element 17, and outlet element 19. To maximize the filtering capacity, the filter cartridge 12 may be generally complementary in shape to the size and shape of the internal cavity 14. In this regard, the filter cartridge 12 may be shaped to be generally conical.

Figure 5:
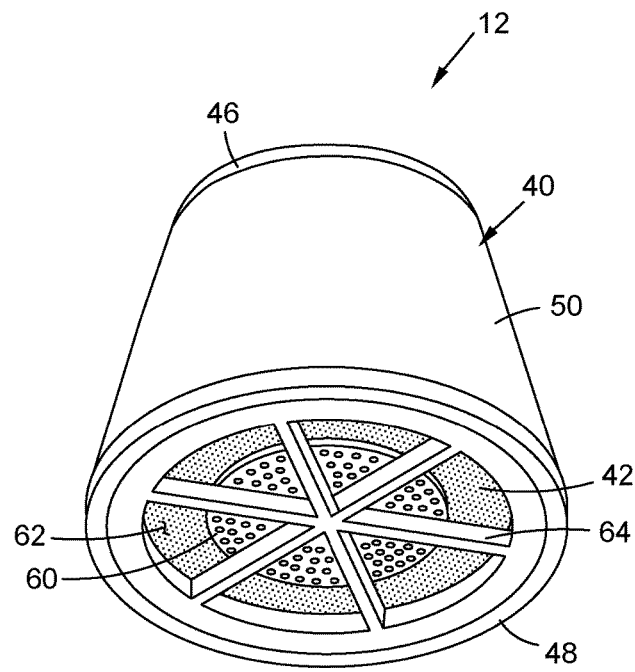
FIG. 5 is a lower perspective view of the filter cartridge shown in FIG. 4.
Figure 6:
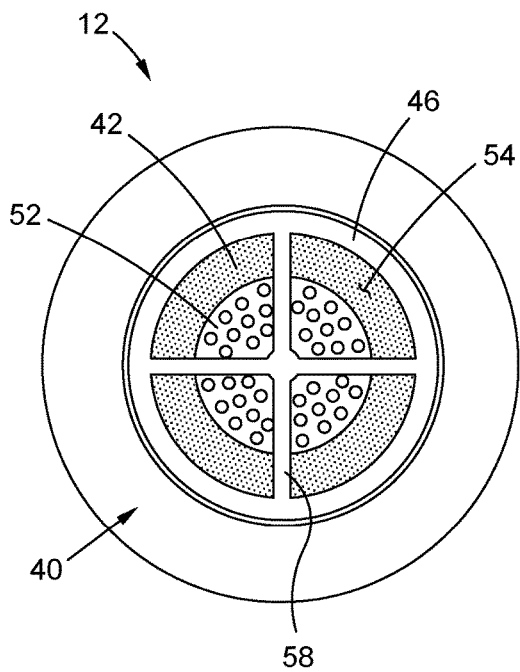
FIG. 6 is a top view of the filter cartridge shown in FIGS. 4 and 5.
Figure 7:
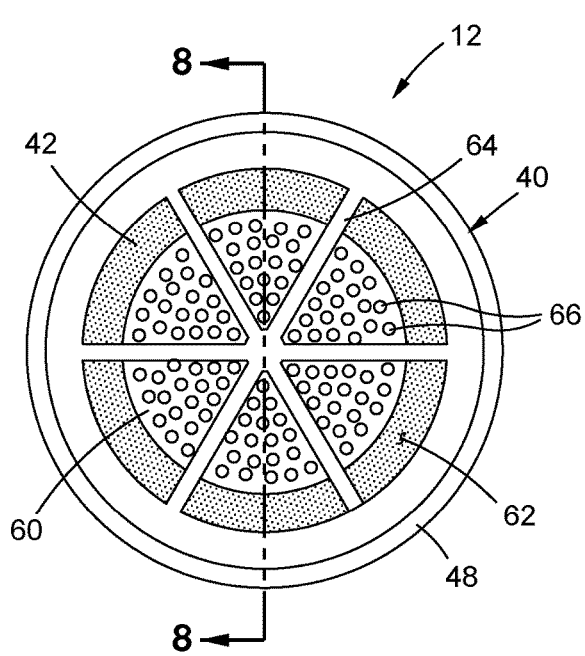
FIG. 7 is a bottom view of the filter cartridge shown in FIGS. 4 and 5.
Figure 8:
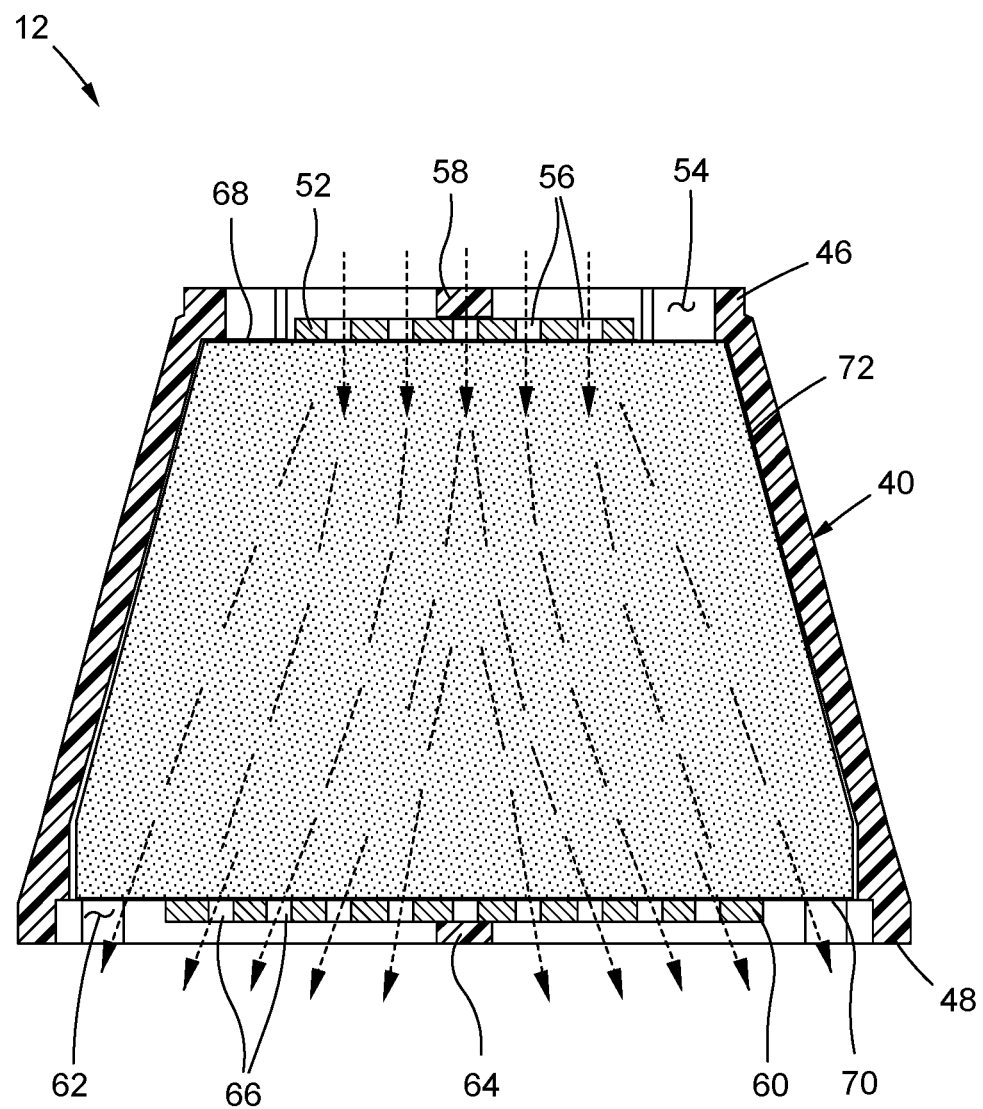
FIG. 8 is a sectional view of the filter cartridge, with the dashed lines and arrows depicting a dispersed water flow through the filter.

According to one embodiment, and referring now to FIGS. 4-8, the filter cartridge 12 generally includes a frame 40 and a filter element 42 coupled to the frame 40. The filter cartridge 12 extends around a cartridge axis 44 (see FIG. 1), and the frame 40 includes an upstream rim 46, a downstream rim 48, and a sidewall 50 extending between the upstream and downstream rims 46, 48. The upstream rim 46, downstream rim 48, and sidewall 50 may each extend around, and be centered about, the cartridge axis 44. The upstream rim 46 may be of a diameter that is smaller than that of the downstream rim 48. The sidewall 50 may be tapered with a variable diameter that is at a minimum adjacent the upstream rim 46, and a maximum adjacent the downstream rim 48.

The frame 40 may additionally include an upstream plate 52 positioned within the upstream rim 46. The upstream plate 52 may be of a diameter that is less than that of the upstream rim 46 to define a void 54 between the upstream plate 52 and the upstream rim 46. The upstream plate 52 may include a plurality of openings 56 formed therein to facilitate passage of fluid through the upstream plate 52. The upstream plate 52 may function as a deflector disk to divert a portion of the inflowing water to the peripheral region of the filter cartridge 12, while the plurality of openings 56 formed within the upstream plate 52 may allow for some of the inflowing water to flow through a central region of the filter cartridge 12. A plurality of upstream spokes 58 may extend from the upstream plate 52, with the plurality of upstream spokes 58 at least partially defining a plurality of upstream voids 54 between the upstream plate 52 and the upstream rim 46. The upstream spokes 58 may extend within an opening defined by the upstream rim 46 and may be coupled to the upstream plate 52 for holding the upstream plate 52 in position relative to the upstream rim 46.

The frame 40 may also include a downstream plate 60 positioned within the downstream rim 48. The downstream plate 60 may be of a diameter greater than that of the upstream plate 52, yet less than that of the downstream rim 48 to define a void 62 between the downstream plate 60 and the downstream rim 48. A plurality of downstream spokes 64 may extend from the downstream plate 60, with the plurality of downstream spokes 64 at least partially defining the plurality of downstream voids 62, which may be greater in number than that of the upstream voids 54. The downstream spokes 64 may extend within an opening defined by the downstream rim 48 and may be coupled to the downstream plate 60 for holding the downstream plate 60 in position relative to the downstream rim 48. The downstream plate 60 may include a plurality of openings 66 formed therein to facilitate passage of fluid through the downstream plate 60. The downstream plate 60 may function as a diverter plate, to maintain fluid flow through both the peripheral region and the central region of the filter cartridge 12. In this regard, the plurality of openings 66 may allow for some water to flow centrally through the downstream plate 60, while urging the remaining water to flow through the peripheral region.

The filter cartridge 12 may further include a filter element 42 coupled to the frame 40 and having a conical configuration including an upstream face 68, a downstream face 70, and a sidewall 72 extending between the upstream face 68 and the downstream face 70, with the upstream face 68 being smaller in diameter than the downstream face 70. The filter element 42 is positioned relative to the frame 40 such that the upstream face 68 of the filter element 42 is in direct fluid communication with the upstream voids 54 and the plurality of openings 56 formed in the upstream plate 52. In this regard, the upstream face 68 receives water flowing through the upstream voids 54 and the plurality of openings 56. The downstream face 70 of the filter element 42 is in direct fluid communication with the downstream voids 62 and the plurality of openings 66 formed in the downstream plate 60. Thus, water exiting the filter element 42 through the downstream face 70 may flow through the downstream voids 62 and the plurality of openings 66. The upstream and downstream faces 68, 70 may be planar, concave, convex, or other configurations known in the art. Furthermore, the filter element 42 may be formed from commonly known filtering materials, such as carbon or the like.

With the basic structure of the showerhead 10 described above, the following discussion relates to an exemplary use of the showerhead 10. The filter cartridge 12 may be placed within the showerhead 10, with the downstream face 70 facing the outlet element 19, the upstream face 68 facing the inlet element 15. With the showerhead 10 assembled in the configuration shown in FIG. 2, the showerhead 10 is connected to the shower arm 22 by engaging the inlet element 15 to the shower arm 22. In the exemplary embodiment, the inlet element 15 is rotated onto the shower arm 22 to effectuate physical and fluid interconnection therebetween. The outlet end of the showerhead 10 may be pivoted or adjusted relative to the swivel connector 18 to achieve a desired angle of water flow from the showerhead 10. Furthermore, if the showerhead 10 is a massaging showerhead 10 with more than one massage setting, the user may select the desired massage setting.

When the water is turned on, the water may flow through the inlet element 15, and then into the internal cavity 14. The water then flows through the filter cartridge 12, which is located in the internal cavity 14. The water entering the filter cartridge 12 may be divided into three separate general flow paths by the upstream plate 52. Water flowing along a first flow path may flow directly through one of the upstream voids 54. Water flowing along a second flow path may flow through the openings 56 formed in the upstream plate 52. Water flowing along a third flow path may impinge on the upstream plate 52 and be diverted outwardly toward the upstream voids 54. By separating the water into three separate flow paths, the water may be distributed across the filter element 42 to flow through both the peripheral regions, as well as the central region thereof.

The water exiting the filter element 42 may be diverted in a similar fashion to the water entering the filter element 42. In particular, the downstream plate 60 may divide the exiting water into three different flow paths. A first exit path may flow from the filter element 42 and directly through a downstream void 62. A second exit path may flow from the filter element 42 and directly through the openings 66 in the downstream plate 60. A third exit path may flow from the filter element 42 and impinge on the downstream plate 60 and flow radially outward and then through the downstream voids 62.

The divided exit flow paths, coupled with the divided entry flow paths urges the water to flow through the entirety of the filter element 42 to maximize the effectiveness and life span of the filter cartridge 12. In this regard, despite the filter cartridge 12 being conical in shape, the water may be distributed throughout the filter element 42 to use the entirety of the filter cartridge and avoid formation of dead zones, e.g., zones through which water does not flow.

Those of ordinary skill in the art will recognize that the filter cartridge 12 is capable of being accommodated by any showerhead defining an internal cavity or chamber having a configuration which is complementary to that of the filter cartridge 12, and that the showerhead 10 described above with its three-piece construction is intended to be only one exemplary implementation. Similarly, the filter cartridge 12, while intended to define a general conical profile, may be provided with maximum height and/or width differing from that shown in the figures without departing from the spirit and scope of the present disclosure.

The particulars shown herein are by way of example only for purposes of illustrative discussion, and are not presented in the cause of providing what is believed to be most useful and readily understood description of the principles and conceptual aspects of the various embodiments of the present disclosure. In this regard, no attempt is made to show any more detail than is necessary for a fundamental understanding of the different features of the various embodiments, the description taken with the drawings making apparent to those skilled in the art how these may be implemented in practice.

What is claimed is:

1. A filter cartridge for placement into an internal cavity of a showerhead, the filter cartridge comprising:
   a frame having an upstream plate which includes a continuous circumferential peripheral edge and is of a first diameter, and a downstream plate which includes a continuous circumferential peripheral edge and is of a second diameter greater than the first diameter, both the upstream plate and the downstream plate having a respective plurality of openings formed therein radially inward relative to the peripheral edge thereof, the frame defining at least one upstream void outside of the peripheral edge of the upstream plate, and at least one downstream void outside of the peripheral edge of the downstream plate; and a filter element coupled to the frame and having a conical configuration including an upstream face, a downstream face, and a sidewall extending between the upstream face and the downstream face, the upstream face being smaller than the downstream face;

the filter element being positioned relative to the frame such that the upstream face of the filter element is in direct fluid communication with the at least one upstream void and the plurality of openings formed in the upstream plate, and the downstream face of the filter element is in direct fluid communication with the at least one downstream void and the plurality of openings formed in the downstream plate;

the upstream void and the openings of the upstream plate being arranged such that when the filter cartridge is operatively positioned within the internal cavity of the showerhead, water flowing into the showerhead will be simultaneously introduced directly into the upstream void and the openings of the upstream plate while further impinging the upstream plate and being diverted into the upstream void in additional quantities; and the downstream void and the openings of the downstream plate being arranged such that water flowing through the filter element will simultaneously flow through and exit the downstream void and the openings of the downstream plate while further impinging the downstream plate and being diverted into the downstream void in additional quantities.

2. The filter cartridge recited in claim 1, wherein the frame includes an upstream rim, a downstream rim, and a sidewall extending between the upstream and downstream rims.

3. The filter cartridge recited in claim 2, wherein the frame includes a plurality of upstream voids positioned between the upstream plate and the upstream rim.

4. The filter cartridge recited in claim 3, wherein the frame includes a plurality of upstream spokes extending from the upstream plate, the plurality of upstream spokes at least partially defining the plurality of upstream voids.

5. The filter cartridge recited in claim 3, wherein the frame includes a plurality of downstream voids positioned between the downstream plate and the downstream rim.

6. The filter cartridge recited in claim 5, wherein the frame includes a plurality of downstream spokes extending from the downstream plate, the plurality of downstream spokes at least partially defining the plurality of downstream voids.

7. The filter cartridge recited in claim 6, wherein there are a greater number of downstream voids than upstream voids, and a greater number of openings in the downstream plate than in the upstream plate.

8. The filter cartridge recited in claim 1, wherein the upstream face is substantially planar.

9. The filter cartridge recited in claim 1, wherein the downstream face is substantially planar.

10. A filter cartridge for placement into an internal cavity of a showerhead, the filter cartridge comprising:

a filter element having an upstream end portion and a downstream end portion; and a frame having a cavity sized to receive the filter element, the frame defining:

at least one upstream opening at least partially circumvented by at least one upstream void of comparatively larger size, the upstream opening being defined by a first portion of the frame, with the upstream void being collectively defined by an outer boundary of the first portion and a second portion of the frame which is not defined by a structural feature also defining the first portion; and at least one downstream opening at least partially circumvented by at least one downstream void of comparatively larger size, the downstream opening being defined by a third portion of the frame, with the downstream void being collectively defined by an outer boundary of the third portion and a fourth portion of the frame which is not defined by a structural feature also defining the third portion;

the upstream opening and void each being in fluid communication with the upstream end portion of the filter element;

the downstream opening and void each being in fluid communication with the downstream end portion of the filter element;

the upstream void and opening being arranged such that when the filter cartridge is operatively positioned within the internal cavity of the showerhead, water flowing into the showerhead will be simultaneously introduced directly into the upstream void and opening while further impinging a portion of the frame and being diverted into the upstream void in additional quantities as collectively facilitates a substantial even distribution of water across the upstream end portion; and the downstream void and opening being arranged such that water flowing through the filter element will simultaneously flow through and exit the downstream void and opening while further impinging a portion of the frame and being diverted into the downstream void in additional quantities as collectively facilitates a substantial even distribution of water across the downstream end portion.

11. The filter cartridge recited in claim 10, wherein the frame includes an upstream rim, a downstream rim, and a sidewall extending between the upstream and downstream rims.

12. The filter cartridge recited in claim 11, wherein the frame includes a plurality of upstream openings defined by an upstream plate and a plurality of upstream voids positioned between the upstream plate and the upstream rim.

13. The filter cartridge recited in claim 12, wherein the frame includes a plurality of upstream spokes extending from the upstream plate, the plurality of upstream spokes at least partially defining the plurality of upstream voids.

14. The filter cartridge recited in claim 12, wherein the frame includes a plurality of downstream openings defined by a downstream plate and a plurality of downstream voids positioned between the downstream plate and the downstream rim.

15. The filter cartridge recited in claim 14, wherein the frame includes a plurality of downstream spokes extending from the downstream plate, the plurality of downstream spokes at least partially defining the plurality of downstream voids.

16. The filter cartridge recited in claim 15, wherein there are a greater number of downstream openings and voids than upstream openings and voids.

17. The filter cartridge recited in claim 10, wherein the upstream end portion defines an upstream face which is substantially planar.

18. The filter cartridge recited in claim 10, wherein the downstream end portion defines a downstream face which is substantially planar.

19. A showerhead comprising:
a body having tapered sidewalls defining an internal cavity, the body being attachable to a water source to receive water therefrom; and
a filter cartridge disposable within the internal cavity, the filter cartridge comprising:
  a frame having an upstream plate which includes a continuous circumferential peripheral edge and is of a first diameter, and a downstream plate which includes a continuous circumferential peripheral edge and is of a second diameter greater than the first diameter, both the upstream plate and the downstream plate having a respective plurality of openings formed therein, the frame defining at least one upstream void outside of the peripheral edge of the upstream plate, and at least one downstream void outside of the peripheral edge of the downstream plate; and
  a filter element coupled to the frame and having a conical configuration including an upstream face, a downstream face, and a sidewall extending between the upstream face and the downstream face, the upstream face being smaller than the downstream face;
the filter element being positioned relative to the frame such that the upstream face of the filter element is in direct fluid communication with the at least one upstream void and the plurality of openings formed in the upstream plate, and the downstream face of the filter element is in direct fluid communication with the at least one downstream void and the plurality of openings formed in the downstream plate;
the upstream void and the openings of the upstream plate being arranged such that when the filter cartridge is operatively positioned within the internal cavity of the showerhead, water flowing into the showerhead will be simultaneously introduced directly into the upstream void and the openings of the upstream plate while further impinging the upstream plate and being diverted into the upstream void in additional quantities; and
the downstream void and the openings of the downstream plate being arranged such that water flowing through the filter element will simultaneously flow through and exit the downstream void and the openings of the downstream plate while further impinging the downstream plate and being diverted into the downstream void in additional quantities.

20. The showerhead recited in claim 19, wherein the frame includes an upstream rim, a downstream rim, and a sidewall extending between the upstream and downstream rims, the sidewall of the frame being complementary in shape to the sidewall of the body.

* * * * *